United States Patent
Rhodes

(10) Patent No.: US 7,219,500 B1
(45) Date of Patent: May 22, 2007

(54) COMPRESSOR FUEL GAS CONDITIONER

(75) Inventor: James E. Rhodes, Farmington, NM (US)

(73) Assignee: Process Equipment & Service Company, Inc., Farmington, NM (US)

( * ) Notice: Subject to any disclaimer, the term of this patent is extended or adjusted under 35 U.S.C. 154(b) by 371 days.

(21) Appl. No.: 11/002,501

(22) Filed: Dec. 2, 2004

(51) Int. Cl.
*F25B 9/02* (2006.01)
*E21F 1/00* (2006.01)
*E21B 36/00* (2006.01)
*B01D 53/24* (2006.01)
*B01D 59/26* (2006.01)
*F04B 17/00* (2006.01)
*F04B 35/00* (2006.01)

(52) U.S. Cl. ............................. 62/5; 417/370; 166/57; 95/34; 96/134

(58) Field of Classification Search .................. 62/5; 417/366, 370; 166/57; 95/34, 271; 96/134
See application file for complete search history.

(56) References Cited

U.S. PATENT DOCUMENTS

| | | | | |
|---|---|---|---|---|
| 3,296,807 | A * | 1/1967 | Fekete | 95/34 |
| 4,026,120 | A * | 5/1977 | Tallant | 62/5 |
| 5,582,012 | A * | 12/1996 | Tunkel et al. | 62/5 |
| 6,932,858 | B2 * | 8/2005 | Nicol et al. | 95/269 |
| 6,962,199 | B1 * | 11/2005 | Tjeenk Willink | 166/265 |

* cited by examiner

*Primary Examiner*—William C Doerrler
(74) *Attorney, Agent, or Firm*—Head, Johnson & Kachigian

(57) ABSTRACT

A compressor fuel gas conditioner for a natural gas well having a compressor which utilizes natural gas from the well as a fuel. The conditioner includes a vortex tube having an inlet to receive compressed natural gas from the compressor, a warm gas outlet for gas which has been heated by circular motion in the vortex tube, and a cool gas outlet for cool gas exiting the vortex tube after passing through the tube wherein the warm gas is returned to an inlet side of the compressor. A salt dryer includes a dryer inlet to receive the cool gas exiting the cool gas outlet of the vortex tube and a dryer outlet to deliver gas from the salt dryer as fuel gas to the compressor.

8 Claims, 2 Drawing Sheets

COMPRESSOR FUEL GAS CONDITIONER

BACKGROUND OF THE INVENTION

1. Field of the Invention

The present invention is directed to an apparatus and method to treat or condition natural gas for use as fuel gas for a compressor.

2. Prior Art

Natural gas is ordinarily gathered from subterranean wells and delivered through pipelines where it may be further treated and then distributed.

At the early stages of the life of a natural gas well, reservoir downhole pressure forces natural gas through the tubing or piping in the well and up to the surface. As a natural gas well begins to age, the reservoir or downhole pressure will tend to decline over time. In some cases, it will eventually reach the same pressure as the pressure within the gas pipeline. At this point, the natural gas well will no longer flow on its own.

A number of solutions to this problem have been devised. One solution is a compressor which is installed on the well, typically at the surface. The compressor will act to boost the gas pressure and allow the gas to continue to flow into the pipeline. It also reduces the pressure that the well has to produce against. In other words, the compressor draws gas out of the well and discharges it into the pipeline at a high enough pressure to keep the fluid flowing.

At least two different kinds of compressors exist. A reciprocating compressor uses an internal combustion engine to drive a shaft and pistons which compress gas. A helical screw compressor uses an internal combustion engine to rotate a helical rotor which turns within a stator to compress gas.

Both kinds of compressors also often include pneumatic controls and instrumentation which use natural gas from the system to operate.

The internal combustion engine of the compressor requires fuel gas to operate. Since the compressor is often at a remote location, this fuel gas is often taken from the natural gas stream from the discharge side of the compressor. The discharge is the outlet or elevated pressure side. The pressure is generally too low on the inlet side for the gas to be utilized by the compressor fuel and control system. The discharge side gas is typically warm since compressing the gas also raises its temperature and it is saturated with water vapor and heavy hydrocarbon vapor. In cold weather, these vapors tend to condense and form liquids in the fuel lines and in the control system lines. In the event that the vapors turn into liquids (or solids when subjected to freezing temperatures), the operation of the various controls and instrumentation, as well as the compressor itself, may be interrupted.

It would, therefore, be desirable to provide a conditioner apparatus and method to condition a portion of compressed natural gas to use as fuel gas to a compressor.

SUMMARY OF THE INVENTION

The present invention provides a fuel gas conditioner for a natural gas compressor which is driven by an internal combustion engine. The compressor operates to draw natural gas from the well and move it into and through a pipeline gathering and distribution system. A portion of the compressed natural gas stream that exits from the compressor is converted from a discharge line and delivered by a diverter line to a vortex tube separator. The natural gas under compression is delivered from the diverter line through a gas inlet in the vortex tube. The gas inlet injects the gas tangentially wherein the natural gas rotates at a high velocity and moves in a cyclonic pattern along the length of the tube. Through the linkage of velocity and pressure, an area of stagnation is formed near the axis of the tube and flow reversal results. During the course of movement in the vortex separation tube, two temperature zones are formed, a warm zone near the tube wall and a cooler zone near the center. A portion of the natural gas is exhausted from a warm gas outlet and then returned to a liquid scrubber and thereafter to the inlet side of the compressor, upstream of the compressor inlet scrubber.

The vortex tube separator also produces condensate formed by the temperature reduction. The liquid, significantly denser than the gas phase, is thrown by centrifugal force to the vortex tube wall where it is separated and gathers by gravity so that it passes through a liquid outlet where it is directed by a liquid line back to the inlet of the compressor, upstream of the compressor inlet scrubber.

The cool natural gas in the vortex tube separator is delivered by a cool gas outlet through a cool gas line to a salt dryer. A non-regenerative or deliquescing desiccant dryer includes a substantially closed container into which the cool gas is delivered. Hydroscopic salts are contained within the dryer having the ability to remove the water vapor. Conditioned fuel gas is removed from the dryer at an outlet line and then delivered back to the compressor as fuel gas to the compressor and as operating gas for various controls and instrumentation.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
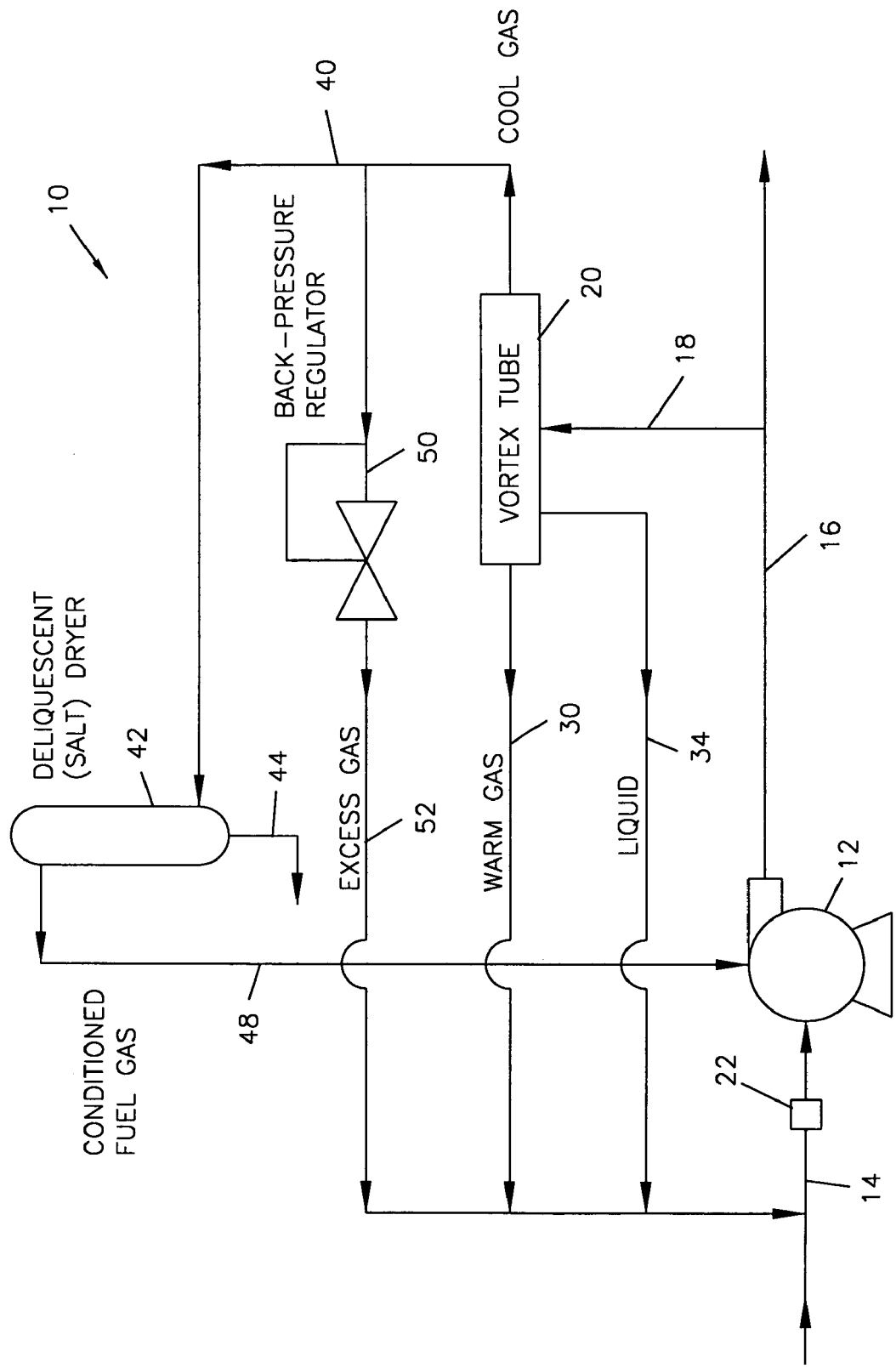
FIG. 1 illustrates a simplified diagrammatic view of a system utilizing the compressor fuel gas conditioner of the present invention.

Referring to the drawings in detail, FIG. 1 illustrates a simplified schematic diagram of a compressor fuel gas conditioner system 10 constructed in accordance with the present invention. A compressor 12 driven by an internal combustion engine would be located near the natural gas well head typically at the surface (not shown). Tubing or pipe from the well would be directed into the compressor via well line 14. This would be known as the input or section end of the compressor. The natural gas from the well is initially passed through a compressor inlet scrubber 22 which removes liquid. The compressor 12 would operate to draw natural gas from the well and move it into and through the pipeline gathering and distribution system as shown at pipeline 16. Various types of compressors may be utilized that use natural gas as a fuel. A portion of the compressed gas stream that exits from the compressor 12 is diverted from the discharge line 16 and delivered via diverter line 18 to a vortex tube separator 20. The natural gas passing into and through the diverter line 18 is under compression.

Figure 2:
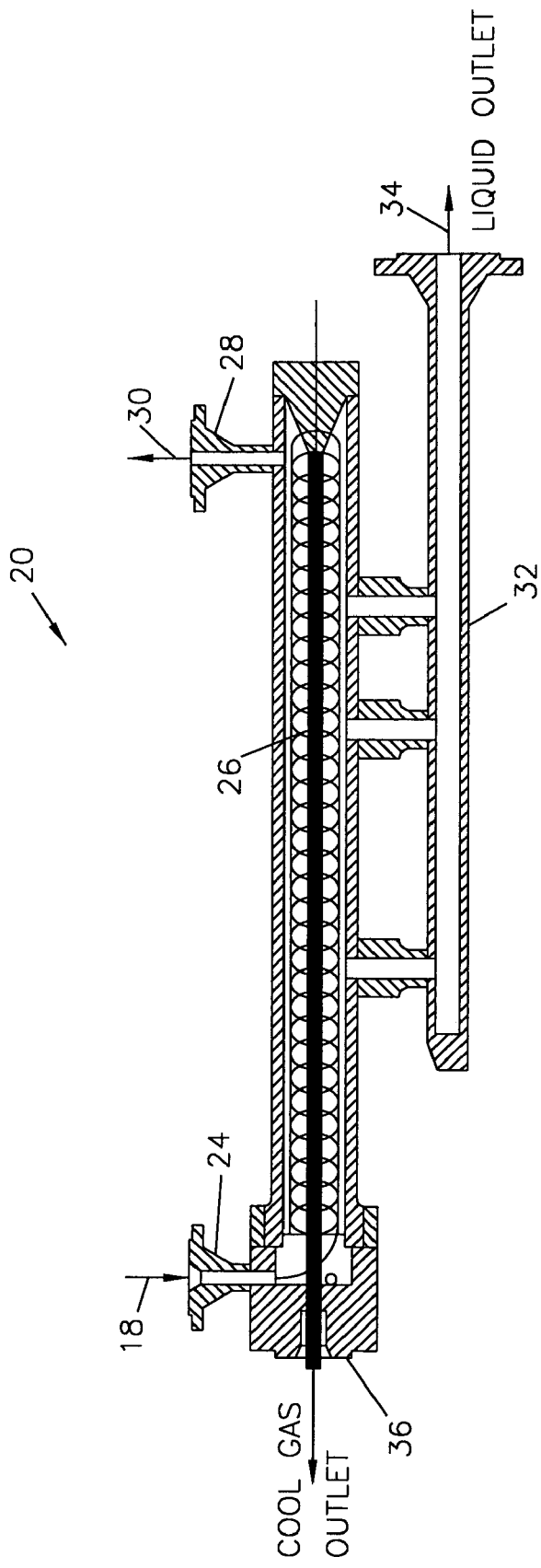
FIG. 2 illustrates a sectional view of a vortex tube utilized as a part of the present invention.

FIG. 2 illustrates a sectional view of a vortex tube separator. The natural gas under compression is delivered through a gas inlet 24 as shown by arrow 18. The gas inlet under compression permits the gas to be injected tangentially through the inlet 24. The natural gas rotates at a high velocity and moves in a cyclonic pattern along the tube as shown by pattern 26. Through the linkage of velocity and pressure, an area of stagnation is formed near the axis of the tube and flow reversal, typical of cyclonic separation devices, results along the central axis. During the course of movement in the vortex tube, two temperature zones are formed, a warm zone near the tube wall and a cooler zone near the center. A portion of the natural gas is exhausted from the warm gas outlet 28 as depicted by arrow 30. The warm gas leaving the vortex tube separator via line 30 is returned to the compressor inlet scrubber 22 and then to the inlet side of the compressor 12.

It is also known that a vortex tube separator will produce condensate formed by the temperature reduction. The liquid, significantly denser than the gas phase, is thrown by the centrifugal forces to the vortex tube wall where it is separated from the gas and gathers by gravity through a liquid outlet 32 where it is directed by liquid line 34 back to the inlet of the compressor inlet scrubber 22.

The cool gas in the vortex tube separator is delivered by a cool gas outlet 36 through a cool gas line 40 to a salt dryer 42. A non-regenerative or deliquescing desiccant dryer 42 includes a substantially closed container into which the cool gas is delivered. Hydroscopic salts are contained within the dryer having the ability to remove water vapor based on the vapor pressure difference between the hydrate of the salt and the vapor pressure of the water in the natural gas. Various types of salts may be used, such as calcium chloride or other formulations including combinations of different salts.

The natural gas passes through the hydroscopic salts where water vapor is removed.

Brine water gathers at the base and may be removed from the base of the dryer as shown at 44. Conditioned fuel gas may be removed from the dryer at an outlet line 48. The conditioned fuel gas is delivered back to the compressor as fuel gas to the compressor and as operating gas for various controls and instrumentation.

A back-pressure regulator 50 is located on the cool gas outlet of the vortex tube. It regulates the cool gas to the correct pressure and volume required by the fuel gas system. Excess cool gas is routed back to the compressor inlet scrubber via line 52.

It has been found that use of the foregoing has the ability to lower the dew point 50° to 70° F. below the compressor discharge conditions.

Whereas, the present invention has been described in relation to the drawings attached hereto, it should be understood that other and further modifications, apart from those shown or suggested herein, may be made within the spirit and scope of this invention.

What is claimed is:

1. A compressor fuel gas conditioner for a natural gas well having a compressor which utilizes natural gas from said well as a fuel, wherein said conditioner comprises:
   a vortex tube having an inlet to receive compressed natural gas from said compressor, a warm gas outlet for gas which has been heated by circular motion within said vortex tube, and a cool gas outlet for cool gas exiting said vortex tube after passing through said tube wherein said warm gas is returned to an inlet side of said compressor; and
   a salt dryer having a dryer inlet to receive said cool gas exiting said cool gas outlet of vortex tube and a dryer outlet to deliver gas from said salt dryer as fuel gas to said compressor.

2. A compressor fuel gas conditioner as set forth in claim 1 wherein said vortex tube includes a liquid outlet line to deliver liquid separated from said gas in said vortex tube back to said inlet side of said compressor.

3. A compressor fuel gas conditioner as set forth in claim 1 including a back pressure regulator having a sensor which senses pressure in said cool gas line between said vortex tube and said salt dryer.

4. A compressor fuel gas conditioner as set forth in claim 3 above wherein said back pressure regulator includes a valve which opens a line back to said compressor inlet in the event that pressure is over a desired amount.

5. A compressor fuel gas conditioner as set forth in claim 1 wherein said salt dryer is a substantially closed container with hydroscopic salts therein.

6. A process for conditioning gas to be used as fuel gas for a compressor attached to a natural gas well which utilizes a portion of the gas as fuel for said compressor, wherein said process comprises the steps of:
   directing a portion of said gas discharged from said compressor into a vortex tube;
   directing said gas in said vortex tube to circulate in said vortex tube in order to separate into a cool gas stream and a warm gas stream;
   directing said warm gas stream from said vortex tube back into an inlet to said compressor;
   directing said cool gas stream from said vortex tube into a salt dryer; and
   directing gas which has passed through said salt dryer back to said compressor as fuel gas for said compressor.

7. A method as set forth in claim 6 above including separating a liquid stream in said vortex tube and directing said liquid stream from said vortex tube back as an inlet to said compressor.

8. A method as set forth in claim 6 including sensing pressure in said cool gas stream from said vortex tube into said salt dryer and opening a valve in the event pressure exceeds a desired amount.

\* \* \* \* \*